United States Patent Office 3,705,828
Patented Dec. 12, 1972

3,705,828
PROCESS TO INCREASE FILLER CONTENT OF CASTABLE EXPLOSIVES, PYROTECHNICS, OR PROPELLANTS
H. William Voigt, Jr., Stanhope, and Bernard R. Banker, Dover, N.J., assignors to the United States of America as represented by the Secretary of the Army
No Drawing. Filed Apr. 5, 1971, Ser. No. 131,416
Int. Cl. C06d 5/06
U.S. Cl. 149—19    15 Claims

ABSTRACT OF THE DISCLOSURE

Explosive, propellant and pyrotechnic compositions are provided which contain as high as 95 weight percent filler substances. These compositions have workable melt viscosity, notwithstanding their unusually high filler content, and they are readily amenable to casting, molding and pelletizing operations. Also, a method is provided for making such compositions. This method involves separately dissolving the respective components in a fluorocarbon, mixing the resulting solution and removing the fluorocarbon from the resulting admixture by the application of mild vacuum.

---

The invention described herein may be manufactured, used and licensed by or for the Government for governmental purposes without the payment to us of any royalties thereon.

BACKGROUND OF THE INVENTION

Prior art

The dispersion of one solid material into another is a well-known practice which has found its way in numerous industrial applications. For example, U.S. 3,022,149 issued Feb. 20, 1962 to Frank B. Cramer discloses a process for dispersing fillers into polymeric materials. In accordance with the process disclosed in this patent, at least one dispersion of a polymerizable material in a non-solvent and non-reactive liquid dispersion medium and at least one dispersion of a filling substance, also in a non-solvent and non-reactive liquid dispersion medium are brought into intimate contact with one another and the mixture is subjected to turbulent agitation. The polymerizable material and the filling substance will coalesce thus forming an agglutinate consisting of the filling substance substantially uniformly dispersed in the polymerizable material. See column 1, lines 52–63, inclusive. Furthermore, this patent discloses that the two liquid dispersion media employed for the polymerizable material and the filling substance, respectively, must be mutually miscible. N-hexane, n-heptane, and the like, are the liquid media which are usually employed in the process described in this patent.

After the formation of the agglutinate, the liquid medium is removed by heating usually at elevated temperatures. The ratio of the dispersed solid (filling substance) to the polymeric material obtained by the method described in the aforesaid patent varies from about 1:2 to about 9:1. This means that the filler content of the resulting composition may be as high as 90 weight percent.

The method described by Cramer has several inherent disadvantages and limitations, particularly when employed for preparing pourable and/or castable compositions of the type contemplated in the present invention. Such compositions are frequently required for pouring into a mold and for casting and pelletizing operations. The compositions obtained following the procedure described in the aforesaid patent are not readily amenable to such processing techniques.

One of the disadvantages of the method described by Cramer is that it requires that the liquid media be a non-solvent for the material dispersed therein while miscible with each other. The liquid media usually employed, i.e., n-hexane or n-heptane must be removed from the resulting agglutinate at the end of the operation. This requires heating the liquid media to elevated temperature which is, of course, a hazardous operation in view of the explosive nature of these solvents. Furthermore, the mixing operation described in this prior art patent takes place under turbulent conditions. This is necessary for uniform dispersion of the filler into the polymer matrix.

Other methods have been resorted to in an effort to provide such compositions having high filler contents, i.e., polymeric materials, explosives, propellants and pyrotechnics which contain as high as 90 weight percent filler substances. One such method resorts to the use of low viscosity liquids in an effort to increase the filler content while attempting to maintain a workable melt viscosity of the composition. However, the selection of such liquid vehicles is severely restricted and often impracticable, either economically or from the standpoint of safety of operation.

Attempts have also been made to increase the particle sizes of the filling substances in an effort to increase the relative weight of the filler in the final composition. The obvious disadvantages of this technique is that the resulting composition will not be uniform, nor will it be homogeneous in character. Furthermore, despite the use of low viscosity liquid and/or increasing the particle sizes of the filling substances, the content of the filler in the resulting compositions have heretofore been limited to between 75 and 85 weight percent. No satisfactory method is known which permits increasing the filler content of such compositions above 90 weight percent while still maintaining a workable melt viscosity so that the resulting composition may be pourable and readily castable.

SUMMARY OF THE INVENTION

The present invention is directed to providing a composition with a high filler content and is particularly related to explosives, propellant and pyrotechnic compositions which are high in filler content.

This invention is also directed to providing such composition having filler contents as high as about 95 weight percent.

In one aspect, the present invention is concerned with providing explosive, propellant and pyrotechnic compositions with high filler content and which are nevertheless readily amenable to casting, molding and pelletizing operations.

In another aspect, this invention relates to castable explosives, propellant and pyrotechnic compositions having high filler contents and which are pourable compositions with workable melt viscosities for casting, molding and pelletizing operations.

Still another aspect of this invention is concerned with providing a method for making compositions of the type heretofore described.

In yet another of its more specific aspects, this invention is directed to the use of fluorocarbons as solvents for the ingredients employed herein in order to facilitate the mixing operation and the ready subsequent removal of the solvent.

These and other aspects of this invention will be more fully comprehended from the following detailed description.

DETAILED DISCLOSURE OF THE INVENTION

It has now been discovered that compositions of the type heretofore described can be prepared while obviating the disadvantages which have heretofore been inherent in the prior art methods of preparing similar compositions. It has been unexpectedly discovered that such compositions may be conveniently prepared by using fluorocarbons as a solvent for the ingredients employed in the preparation of these compositions in accordance with the method of this invention.

The invention herein basically comprises preparing two separate solutions of the respective ingredients of the final composition (as hereinafter defined), mixing these two solutions at ambient conditions with mild agitation to form the desired composition and finally removing the solvent by the application of a slight vacuum.

In order to more clearly understand this invention and appreciate its advantages over the prior art methods, the details of the method of this invention will now be illustrated with reference to the preparation of a smoke (explosive) composition. However, this description must not be construed to be limited to the preparation of this composition. Other compositions such as, for example, propellants, pyrotechnics and even some polymeric materials may also be prepared following the procedure described herein.

In the ensuing discussion and throughout this application and the appended claims the term "filler" shall refer to the explosive, propellant or pyrotechnic ingredients of the final composition. The remainder of this composition is usually a binder material.

In one batch, 6 weight percent castor oil (a polyol) was blended with 31 weight percent mnaganese oxide ($MnO_2$), an oxidant. Sufficient trichlorofluoroethane was added to this blend until the resutling mixture (solution had a pourable viscosity.

In another batch, 3 weight percent liquid diisocyanate was blended with 49.3 weight percent of stabilized red phosphorous powder, and 7.0 weight percent finely divided (atomized) magnesium of size 250–325 mesh. As in the first batch, sufficient trichlorofluoroethane was added to achieve a pourable viscosity.

The aforesaid two batches were then mixed at ambient conditions under mild agitation. The polyol and the diisocyanate are thus reacted to form a polyurethane which acts as the binder for the smoke composition (filler). When the polyurethane formation is complete, the solvent, i.e., trichlorofluoroethane was removed by the application of a mild vacuum to the resulting mixture in a sealed container.

In the aforesaid description, the resulting smoke composition will constitute approximately 87 weight percent of the entire composition, the remaining 13 weight percent being the polyurethane binder.

By preparing two separate batches as aforesaid, the fuel and the oxidant remain separate until the ultimate mixture is ready for casting. This obviates premature explosion and fire hazards. However, when the likelihood of such hazard is minimal or non-existent due to the nature of the ingredients, the entire operation may be carried out in a single batch.

If desired, the composition prepared in the above-described manner may be re-enforced with fiber before its final formation. This may be accomplished by adding nitrocellulose fiber or a polyester fiber (polyethylene terphthalate) of 1.5 denier type 54 which is preferably cut up to approximately ¼ inch lengths. Approximately 1 percent by weight of such fiber, stirred into the pourable mixture, provides sufficient re-enforcement for the final composition.

Furthermore, if desired, a plasticizer such as, for example, a polyester resin may be added in small amounts to the batch containing the diisocyanate before the batches are brought into intimate contact as hereinbefore described. The addition of plasticizer will plasticize the polyurethane binder hence imparting additional flexibility to the final composition.

It is apparent from the foregoing description that the fuel element (red phosphorous and magnesium) and the oxidizing agent (manganese dioxide) are not brought into contact with one another until the mixture is ready to be formed. As was previously stated, this will avoid the danger of increased flammability and fire hazard. Furthermore, since the polyol and dissocyanate are also kept in separate batches until they are ready to be poured into a mold or container, there is no danger of setting of the polyurethane binder before the formation of the final composition.

The propellants, pyrotechnics and explosives which are suitable for the purpose of this invention are generally known in the art. Examples of suitable propellants include ammonium perchlorate, nitrocellulose and nitroguanidine. Examples of explosives include octahydro-1,3,5,7-tetranitro-1,3,5,7-tetrazine (commonly referred to as HMX), hexahydro-1,3,5,7-trinitro-sym-triazine (commonly referred to as RDX or cyclonite) and pentaerythritol tetranitrate, and pyrotechnics include the powdered metals and oxidants which are known in the art.

While polyurethane has heretofore been mentioned as the binder material for said compositions, other similar binder substances may be employed with substantially equally efficacious results. It must be borne in mind that when using other binder materials, such binders must preferably be soluble in the fluorocarbon solvent and must, furthermore, be amenable to in situ formation as previously described.

The amount of the filler and the relative amounts of the other ingredients may be varied depending upon the ultimate desired composition. Thus, explosive, propellant and pyrotechnic compositions may be prepared having as high as about 95 weight percent filler while still maintaining a workable melt viscosity suitable for casting, molding and pelletizing of such compositions.

The fluorocarbons which are suitable for the purpose of this invention are preferably those which are liquid at ambient conditions. Such fluorocarbons include $CCl_2F\text{-}CClF_2$ (trichlorotrifluoroethane) and $CCl_3F$ (trichlorofluoromethane), and the like.

Also, other polyurethanes or similar binding materials may be employed as the binder portion of the desired final composition of this invention. Such other polyurethanes and binders must preferably be soluble in the particular solvent which is employed. For example, another polyurethane which may be suitably employed is that prepared by the copolymerization of 2,4-tolylene diisocyanate and 1,4-butylene oxide polyglycol. In this case also, the diisocyanate and the polyglycol are kept in separate solutions so as to prevent premature setting of the composition. When mixed in one batch, such as in those instances where there is no danger of flammability, the fluorocarbon itself acts to delay the reaction of polyol with diisocyanate until the fluorocarbon is removed from the mixture.

It is readily apparent from the foregoing description of the invention that several modifications may be made both with respect to the compositions and the method of their preparation, without departing from the spirit of the present invention.

It must be further pointed out that while this invention has heretofore been described in connection with the preparation of explosives, propellant and pyrotechnic materials, the principles set forth herein may be applied in the preparation of polymeric or other materials with high inert filler contents.

Also, while it is preferable to dissolve the various ingredients in a fluorocarbon solvent, it may be appreciated that not all binders are soluble or miscible in the desired fluorocarbon solvent. In such instances, it has been found desirable to add a gelling agent to each batch, prepared as hereinbefore described. Upon addition of the gelling agent, the fluorocarbon is gelled and the various ingredients remain dispersed therein. When the two batches are thereafter admixed, the resulting mixture is subjected to vacuum to remove the fluorocarbon, leaving the desired final composition.

Several gelling agents may be employed for gelling the fluorocarbons in accordance with this embodiment of the invention. The choice of the gelling agent and the amount required will, of course, vary depending upon the particular fluorocarbon which is employed. In general, it has been found that aluminum soap gellants such as, e.g., aluminum hydroxy stearate, used in concentrations of up to about 2 weight percent, provide an adequate gel formation. Other aluminum soap gellants include the esters derived from unsaturated acids of about 18 carbon atoms containing free aluminum hydroxide such that the aluminum is associated with two acid radicals and one hydroxy group in the molecular chain.

As was previously mentioned, the filler content of the final desired composition may be as high as 95 weight percent. The ultimate filler content is generally dictated by the amount of the respective ingredients used in the preparation of the pourable mixtures as hereinbefore described. Thus, the filler content of the resulting final composition may be at least 75 weight percent and is preferably from about 85 to about 95 weight percent of the total composition.

Thus explosive, propellant and pyrotechnic compositions may be made in accordance with this invention which have a high filler content, which compositions are readily amenable to casting, molding and pelletizing operations. Such compositions exhibit superior explosive, propellant or pyrotechnic characteristics (as the case may be) as compared to similar compositions which contain less filler content.

What is claimed is:

1. A composition of matter comprising at least about 75 weight percent of filler substance, the remainder being a binder for said filler substance wherein said filler substance consists of a mixture of a powdered metal, red phosphorus and an inorganic oxidizer and wherein said binder is a polyurethane material produced from the reaction of a polyol and an organc isocyanate compound.

2. A method of preparing a composition of matter comprising at least 75 weight percent of a filler substance, the remainder being essentially a polyurethane produced from the reaction of a polyol and an isocyanate compound, said filler substance being selected from the group consisting of explosive, propellant and pyrotechnic materials, said method comprising separately preparing a first mixture comprising said filler substance, said polyol and a fluorocarbon, a second mixture comprising said isocyanate compound and a fluorocarbon, admixing said first mixture and said second mixture at ambient conditions until said polyurethane is formed, and removing said fluorocarbon from the resulting mixture.

3. The method of claim 2 wherein said fluorocarbon is trichlorotrifluoroethane.

4. The method of claim 2 wherein said fluorocarbon is trichlorofluoromethane.

5. The method of claim 2 wherein said fluorocarbon is removed by application of vacuum.

6. A method of preparing a composition of matter comprising from about 85 weight percent to about 95 weight percent of a filler substance, the remainder being essentially a polyurethane produced from the reactions of a polyol and an isocyanate compound, said filler substance being selected from the group consisting of explosive, propellant and pyrotechnic materials, said method comprising separately preparing a first mixture comprising said filler substance, said polyol and a fluorocarbon, a second mixture comprising said isocyanate compound and a fluorocarbon, admixing said first mixture with said second mixture at ambient conditions until said polyurethane is formed, and removing said fluorocarbon from the resulting mixture.

7. The method of claim 6 wherein said fluorocarbon is trichlorofluoromethane.

8. The method of claim 6 wherein said fluorocarbon is trichlorotrifluoroethane.

9. The method of claim 6 wherein said fluorocarbon is removed by application of vacuum.

10. The method of claim 9 wherein said fluorocarbon is removed by application of vacuum.

11. The method of claim 8 wherein said fluorocarbon is removed by application of vacuum.

12. A method of preparing a composition of matter comprising at least 75 weight percent of a filler substance, the remainder being essentially a polyurethane produced from the reaction of a polyol and an isocyanate compound, said filler substance being selected from the group consisting of explosive, propellant and pyrotechnic materials, said method comprising separately preparing a first mixture comprising said filler substance, said polyol and a fluorocarbon in which said filler is essentially insoluble, a second mixture comprising said isocyanate compound and a fluorocarbon, admixing said first mixture with said second mixture, adding a gelling agent to the resulting mixture, and removing said fluorocarbon from the resulting mixture.

13. The composition of claim 1 wherein the powdered metal is selected from the group consisting of magnesium, aluminum, lithium, potassium, calcium and mixtures thereof.

14. The composition of claim 1 wherein the inorganic oxidizer is selected from the group consisting of ammonium, alkali metal and alkaline earth metal chlorates, perchlorates, peroxides, chromates and nitrates.

15. A smoke generating composition comprising at least about 75 weight percent of filler substance, the remainder being a binder for said filler substance wherein said filler substance consists of a mixture of red phosphorus powder, powdered magnesium and manganese dioxide and wherein said binder is a polyurethane material obtained by reacting castor oil with a liquid diisocyanate.

References Cited

UNITED STATES PATENTS

| 3,529,042 | 9/1970 | Lippert | 149—19 |
| 3,213,173 | 10/1965 | Cobb | 264—3 R |
| 3,014,796 | 12/1961 | Long et al. | 149—19 |
| 3,184,352 | 5/1965 | Baker | 149—19 |
| 3,022,149 | 2/1962 | Cramer | 149—19 |

BENJAMIN R. PADGETT, Primary Examiner

U.S. Cl. X.R.
149—20, 30, 31